United States Patent [19]

Neidhardt et al.

[11] 4,177,235

[45] Dec. 4, 1979

[54] METHOD OF MANUFACTURING ELECTRICALLY FUSED CORUNDUM

[75] Inventors: Manfred Neidhardt, Siegburg; Gerhard Rehfeld, Aachen, both of Fed. Rep. of Germany

[73] Assignee: Dynamit Nobel Aktiengesellschaft, Troisdorf, Fed. Rep. of Germany

[21] Appl. No.: 860,525

[22] Filed: Dec. 14, 1977

[30] Foreign Application Priority Data

Dec. 22, 1976 [DE] Fed. Rep. of Germany ....... 2658124

[51] Int. Cl.$^2$ .............................................. C04B 35/10
[52] U.S. Cl. ................................... 264/140; 106/73.4; 264/233; 264/327; 264/332; 264/344
[58] Field of Search ....................... 106/65, 73.4, 73.5; 264/299, 332, 344, 327, 140, 233; 156/653, 657

[56] References Cited

U.S. PATENT DOCUMENTS

| | | | |
|---|---|---|---|
| 3,479,237 | 11/1969 | Bergh et al. | 156/653 |
| 3,839,111 | 10/1974 | Ham et al. | 156/657 |
| 3,841,904 | 10/1974 | Chiang | 156/657 |

OTHER PUBLICATIONS

Refractories and Their Uses, pp. 137, 138, 139 (1972).

*Primary Examiner*—Robert F. White
*Assistant Examiner*—John A. Parrish
*Attorney, Agent, or Firm*—Sprung, Felfe, Horn, Lynch & Kramer

[57] ABSTRACT

A composition comprising $\alpha$-alumina in a concentration of at least 99.95 weight percent and process for producing such $\alpha$-alumina wherein alumina having an alkali metal content between 0.05 and 0.60 weight percent and $Al_2O_3$ content of more than 95 weight percent is electrically fused with silica and additional alkali, if desired, in an electric arc furnace, the heated composition is cooled, comminuted and the so-formed glass phase is removed from an alumina containing phase by mechanical or chemical means.

13 Claims, No Drawings

METHOD OF MANUFACTURING ELECTRICALLY FUSED CORUNDUM

BACKGROUND OF THE INVENTION

1. Field of the Invention

This invention relates to an α-corundum composition of exceptionally high purity of at least 99.95 weight percent. This invention is also directed to a method of forming such a highly pure α-corundum composition by heating alumina having an alkali content between 0.05 and 0.60 and alumina content of more than 95 weight percent with silica and additional alkali if desired, in an electric arc furnace, cooling the resultant melt, comminuting the same and separating the so formed glass phase from an α-corundum phase by chemical and/or mechanical methods.

2. Discussion of the Prior Art

Electric furnace corundums are generally manufactured by the fusion of raw materials rich in aluminum oxide in the electric furnace. If it is desired to produce corundums of high aluminum oxide content, which are known as noble corundums, aluminas known as Bayer aluminas are used in most cases as the raw material. Such aluminas, which are chemically produced by the alkaline treatment of bauxite, yield corundums upon melting which consist of aluminum oxide of a purity of 99.6% by weight, but a portion, up to 7% of the weight of the aluminum oxide, consists of undesirable β-corundum.

In recent times, however, corundums have been required for ceramics and special purpose ceramics, such as ceramics for cataphoresis, bioceramics or electroceramics, or for certain special abrasive applications, such as the finishing of semiconductor material, which contain 99.9% pure aluminum oxide by weight, and are largely free of β-corundum. In the applications named above, the principal impurities, such as alkalies and silicon dioxide, as well as β-corundum, are undesirable.

For the production of noble corundums of an especially high purity and a high α-corundum content it has been considered necessary to use extremely pure, low-alkali aluminas as the raw material for fusion. The alkali content was to amount to no more than 0.1% by weight in order to arrive at noble corundums of up 99.8 wt.-% $Al_2O_3$.

The production of such pure raw materials, however, involves a considerable technical investment, which makes the raw materials and hence the end product extraordinarily expensive. It is furthermore disadvantageous that, in general, one does not exceed in obtaining a purity better than approximately 99.8% by weight. Another disadvantage is that the quality of the corundum produced always depends on the quality of the $Al_2O_3$ charge put into the furnace in each case. In addition, impurities can intrude during the melting and crushing process to further diminish the purity below the desired level.

SUMMARY OF THE INVENTION

It is an object of this invention to provide a method for the production of nobel corundum in which the purity of the raw material, especially in regard to alkali content, is virtually of no importance to the purity of the end product. It is a further object of this invention to provide a process which produces nobel corundum of high α-$Al_2O_3$ content. It is a further object of this invention to provide a new noble corundum composition having an α-$Al_2O_3$ content greater than 93 weight percent.

Broadly this invention contemplates a method of forming an α-corundum composition of at least 99.95% which method comprises heating an alumina having an alkali content between 0.05 and 0.60 weight percent and an $Al_2O_3$ content of more than 95 weight percent and silica in an electric arc furnace at temperatures sufficient to form a melt, cooling the resultant melt whereby to form an α-corundum phase in a siliceous matrix and thereafter separating the siliceous matrix from the α-corundum phase.

In accordance with the process of this invention commercially available common aluminas can be employed to form an α-corundum composition of high α-corundum content. The aluminas useful in accordance with the invention have an alkali content between 0.05 and 0.60 weight percent and an $Al_2O_3$ content of more than 96 weight percent. Such aluminas are heated together with $SiO_2$ such as in the form of quartz sand in an electric arc furnace at a temperature sufficient to form a melt. Along with the alumina and the silica there can be present additional alkalies, as described below. A melt is formed and the same is permitted to cool whereby there is obtained a composition comprising an α-corundum phase in a siliceous matrix, e.g., glass phase. The composition is then comminuted and the siliceous phase is removed from the α-corundum phase by mechanical and/or chemical means to leave behind an α-corundum composition having an α-corundum content of at least 99.95 weight percent.

The subject of the invention, therefore, is a method for the manufacture of electrically fused corundum, which is characterized in that (a) commercial aluminas having alkali contents between 0.05 and 0.60 wt.-% and $Al_2O_3$ contents of more than 95 wt.-%, (b) $SiO_2$, such as quartz sand, for example, and (c) alkalies, if desired, are melted in the electrical arc furnace, the melt is cooled and crushed in a known manner, and then the glass phase that has formed is separated by mechanical and/or chemical methods.

The term, "alkalies," as used herein, refers to alkali metal compounds which have been determined by methods of chemical analysis and reckoned as alkali oxide. The alkalies may be present naturally in the raw material used, or they can also be added, as will be further explained below, to the mixture of raw materials.

The method of the invention has the advantage that one can employ ordinary commercial aluminas of comparatively high alkali content. Such aluminas, which are generally manufactured by the Bayer process (cf., for example, Ullmann, "Encyclopadie der technischen Chemie," vol. 3 (1953), pp. 375 to 389), generally have the following chemical analysis:

| | |
|---|---|
| $SiO_2$ | 0.02 to 0.03 wt.-% |
| $TiO_2$ | 0.005 to 0.01 wt.-% |
| $Fe_2O_3$ | 0.02 to 0.03 wt.-% |
| CaO | 0.02 to 0.1 wt.-% |
| MgO | 0.005 to 0.006 wt.-% |
| $Na_2O$ | 0.25 to 0.6 wt.-% |
| $Al_2O_3$ | 99.3 to 99.8 wt.-%. |

If desired, other aluminas obtained by chemical methods and containing larger amounts of alkali or containing impurities totalling up to 5 wt.-% can be used in the method of the invention.

The SiO$_2$ additives can be naturally occurring, SiO$_2$-rich mineral raw materials, such as quartz sand, or synthetically manufactured raw materials, such as quartz glass and silica gel, as well as alkali silicate glasses and slags, individually or in mixtures. Quartz sand is preferred. Quartz sand containing at least 98% SiO$_2$ by weight is especially preferred.

The amount of SiO$_2$ to be added is selected in the method of the invention so as to assure the formation of a glass phase to bind the alkali content of the alumina, and so as to prevent or largely suppress the formation of β-corundum. The amount of SiO$_2$ to be added is generally governed by the amount of alkali present in the total mixture. The raw material mixtures to be melted are therefore to contain one mole of SiO$_2$ per mole of alkali, in accordance with the equation SiO$_2$+Na$_2$O→Na$_2$SiO$_3$. However, SiO$_2$ is added preferably in an amount greater than the stoichiometric, namely in amounts corresponding to from more than the stoichiometrically necessary amount of SiO$_2$ to 10 times that amount, preferably to 5 times that amount, with reference to the amount of alkali. In the above-mentioned commercial silicas having Na$_2$O contents of 0.20 to 0.6 wt.-%, it is desirable to add 0.25 to 3.3 wt.-% of SiO$_2$, in the form, for example, of quartz sand of a purity of 99.5 wt.-% of SiO$_2$.

Surprisingly, when the mixtures of the invention are melted in the arc furnace and then cooled, high-purity α-corundum crystals are obtained, which are embedded in an alkali silicate matrix (or, in the particularly named case, a sodium silicate matrix). Furthermore, the glass phase that forms contains all the other impurities, such as TiO$_2$, Fe$_2$O$_3$, CaO and MgO. The process of the invention provides a composition comprising an α-alumina phase of purity of at least 99.95 weight percent and up to 99.97 weight percent. α-alumina can exist in a siliceous matrix such as a glass matrix. The α-alumina can be separated from the matrix (which contains the impurities) by crushing or shattering, comminution and acid washing or sieving.

The process of the invention can be conducted such that the formation of the undesired β-corundum crystals is completely prevented, since the alkalies present are entirely bound in the glass phase that forms. Nothing but α-corundum is formed, and this has been confirmed by X-ray spectrography by the absence of the interferences characteristic of β-corundum.

The melt is poured into prepared molds and cooled. The primary crystal size can be controlled in a known manner by controlling the rate of cooling.

For the production of particularly small primary crystals, the melt can be cooled, for example, in thin layers by pouring them into flat, thick-walled molds or by pouring them into molds filled with metallic cooling bodies (cf., for example, German Offenlegungsschrift 2,107,-455). Thus primary crystal sizes are generally obtained which average from 100 to 150 microns.

An additional reduction of the primary crystal size of the α-corundum to less than 100 microns can be achieved in accordance with the invention by increasing the content of SiO$_2$ in the raw material mixture to about 15 wt.-% of SiO$_2$, generally between 0,5 and 6 weight percent. However, care must be taken to prevent the formation of mullite (2Al$_2$O$_3$.SiO$_2$).

The formation of mullite can be prevented by using in this case raw material mixtures having alkali oxide contents of from more than 0.6 to 5 wt.-%, preferably up to 3 wt.-%. In that case one can set out from appropriately alkali-rich silicas and/or potassium compounds, e.g., in the form of their carbonates or silicatic compounds, can be added to the Al$_2$O$_3$/SiO$_2$ starting mixture in the required amount, so that the molar ratio of Na$_2$O:SiO$_2$ in the total mixture will amount to from 1:1 to 1:10, preferably from more than 1:1 to 1:5.

For the production of specific primary crystal sizes and thus specific grain sizes, the above-described procedures can be used singly or in combination.

The mixture of raw materials is melted in the electric arc furnace at temperatures of, for example, 1900° to 2100° C.

The cooled material is first coarsely crushed or shattered in a known manner, by means of jaw crushers or roller mills, for example, and is then further comminuted, for example in an oscillating or rotary ball mill. Then this material is subjected to sieving and/or acid washing.

Especially when the material is to be used as loose abrasive grits, the fines are removed by sieving at the desired grain size and the coarse grits are subjected to mill sorting in accordance with U.S. Pat. No. 4,049,397, of the assignee hereof, the disclosure of which is hereby incorporated herein by reference (cf. German Offenlegungsschrift No. 2,420,551) in a mill containing loose grinding elements, the mill sorting being performed preferably prior to the washing process. The ratio of the number and size of the grinding elements to the amount of grits charged is so adjusted that the fracture of the grains will take place mostly in the mechanically weaker silicate matrix between the corundum crystals.

It is preferable in this case to use a fused material which was made by rapid chilling of the melt containing, if desired, as much as 15 wt.-% of SiO$_2$, as described above. By means of mill sorting, a large part of the silicate matrix can be separated from the desired coarser α-corundum crystals by mechanical means (by subsequent separating or sieving out the fines, which consist substantially of the silicate matrix). At the end of the washing and of the drying that follows, corundum grain sizes are obtained which correspond predominantly to the primary crystal sizes of the α-corundum in the hardened melt.

By the washing process that follows the comminution and the after-treatment, if any, the grits can be further purified to a residual content of, for example, less than 0.005 wt.-% of SiO$_2$.

The granulated material is subjected to an acid washing, then freed of the acid residues, and dried. Suitable acids are hydrochloric acid and/or hydrofluoric acid. For the washing it is desirable to use, in a first stage, aqueous hydrochloric acid, e.g., 5% to 35% hydrochloric acid, and after that to perform a treatment with 5% to 10% aqueous hydrofluoric acid.

The treatment with hydrofluoric acid can be performed in the manner described in German Auslegeschrift No. 1,911,386, the disclosure of which is hereby incorporated herein by reference. In the treatment of the material with aqueous hydrochloric acid, a similar procedure can be followed by mixing, for example, 150 kg of the material to be washed, with 150 liters, for example, of 18% aqueous hydrochloric acid, and stirring this mixture slowly for one to three hours at room temperature. Then the acid is poured off and the granulated material is freed of adhering acid by repeated washing with water as free of salt as possible, and decanting, and then dried.

The corundum made by the method of the invention has a higher surface activity than formerly prepared, comparable corundums. A proof of this is a lowering of the vitrification temperature by about 100° to 150° C. below that of a fused corundum of the same grit size but containing more impurities.

The method of the invention has the additional advantage, among others, that the desired grain size and the desired purity, including such very high purities as, for example, 99.7 wt.-% and more, can be obtained in a controlled and repeatable manner, and does not depend on the raw materials or on their degree of purity.

In order to more fully illustrate the nature of the invention and the manner of practicing the same the following examples are presented.

EXAMPLES

In the following examples, the raw materials and mixtures thereof were melted in a conventional manner in a tilting 800 kVA three-phase alternating current arc furnace. The melt was poured into cold steel molds having a bottom surface measuring 120×60 cm and a wall thickness of 60 mm, to form slabs 10 cm and 30 cm thick. After cooling to room temperature, the slabs were crushed in jaw crushers and roll crushers, coarsely at first to particles smaller than 2 mm. Then the coarsely crushed material was treated for three hours in batches in a tube mill 200 cm long and 90 cm in diameter, operating at 33 revolutions per minute. The tube mill contained 400 kg of material to be ground in each batch, and 1000 kg of steel balls of 40 mm diameter. The material thus treated was then washed with 18% hydrochloric acid and then with 10% hydrofluoric acid. (Basically, the sequence of the acids can be reversed). By repeated washing with desalted water the material was freed of the acid and then dried.

EXAMPLE 1

In the following table, column I contains the chemical composition of the starting alumina used in preparing the products in columns II and III. 2300 kg of this starting alumina was melted without the addition of $SiO_2$; the corundum product was crushed and washed in hydrochloric acid and hydrofluoric acid, and then had the chemical composition given in column II. In the case of column III, 34.5 kg of quartz sand was added to 2300 kg of the alumina of column I (1.5 wt.-% $SiO_2$), and this mixture was melted. After the corundum obtained was crushed and washed in hydrochloric acid and hydrofluoric acid it had the chemical composition given in column III.

|  | I | II | III |
| --- | --- | --- | --- |
| $SiO_2$ | 0.02% | <0.005% | <0.005% |
| $TiO_2$ | 0.008% | 0.006% | <0.001% |
| $Fe_2O_3$ | 0.02% | 0.018% | 0.007% |
| CaO | 0.1% | 0.08% | <0.01% |
| MgO | 0.005% | 0.005% | 0.001% |
| $Na_2O$ | 0.28% | 0.26% | <0.005% |
| Balance $Al_2O_3$ | 99.56% | 99.62% | 99.97% |

When the melt was cast and had solidified in a layer 10 cm thick, the primary crystal sizes of the α-corundum, as measured microscopically, were approximately 5 μm to approximately 80 μm, a few crystals of up to 150 μm; the average primary crystal size was approximately 45 μm.

When the melt was cast and had solidified in a layer 30 cm thick, the primary crystal sizes of the α-corundum, as measured microscopically, were approximately 20 μm to approximately 250 μm, a few crystals of up to 600 μm; the average primary crystal size was 115 μm.

EXAMPLE 2

In the following table, column IV gives the chemical composition of the starting alumina used in preparing the products whose chemical composition is given in columns V and VI. In the case of column V: 2300 kg of alumina IV was melted without the addition of $SiO_2$, and the corundum product was crushed and washed in hydrochloric acid and hydrofluoric acid. In the case of column VI: 73.6 kg of quartz sand was added to 2300 kg of alumina IV (3.2 wt.-% $SiO_2$). The mixture was melted and the corundum obtained was crushed and washed in hydrochloric acid and hydrofluoric acid.

|  | IV | V | VI |
| --- | --- | --- | --- |
| $SiO_2$ | 0.02% | 0.005% | <0.005% |
| $TiO_2$ | 0.01% | 0.007% | <0.001% |
| $Fe_2O_3$ | 0.02% | 0.02% | <0.005% |
| CaO | 0.06% | 0.05% | <0.01% |
| MgO | <0.005% | <0.005% | <0.001% |
| $Na_2O$ | 0.54% | 0.51% | <0.005% |
| Balance $Al_2O_3$ | 99.34% | 99.40% | 99.97% |

In the determination of the primary crystal sizes in the corundum cast and solidified in layers 10 cm and 30 cm thick, a shift towards smaller diameters than in Example 1 was noted. The average primary crystal sizes in this case were about 25 μm and 75 μm, respectively.

EXAMPLE 3

In the following table, column VII gives the chemical composition of the starting alumina used in preparing the products whose chemical composition is given in columns VIII and IX. In the case of column VIII: 2300 kg of alumina VII was melted without the addition of $SiO_2$, and the corundum product was crushed and washed in hydrochloric acid and hydrofluoric acid. In the case of column IX, 3.5 kg of quartz sand was mixed with 2300 kg of alumina VII and the mixture was melted; the corundum obtained was crushed and washed in hydrochloric acid and hydrofluoric acid.

|  | VII | VIII | IX |
| --- | --- | --- | --- |
| $SiO_2$ | 0.03% | 0.006% | <0.005% |
| $TiO_2$ | 0.005% | 0.004% | 0.003% |
| $Fe_2O_3$ | 0.03% | 0.03% | 0.01% |
| CaO | 0.02% | 0.01% | <0.01% |
| MgO | 0.006% | 0.005% | 0.001% |
| $Na_2O$ | 0.078% | 0.032% | <0.005% |
| Balance $Al_2O_3$ | 99.83% | 99.91% | 99.96% |

No evaluation was made of the primary corundum crystal sizes in the 10 cm and 30 cm thick cast slabs because the corundum crystals were mainly of a size exceeding 200 μm.

In this example, substantially larger α-$Al_2O_3$ primary crystals form upon the cooling of the melt, since the silicate matrix content in this composition was comparatively low and thus the growth of the corundum crystals was less inhibited.

What we claim is:

1. A method for preparing an α-corundum composition having an α-corundum content of at least 99.95 weight percent from an alumina containing at least one impurity of the group consisting of $TiO_2$, $Fe_2O_3$, CaO and MgO which comprises heating said alumina which has an alkali content of between 0.05 and 0.60 weight percent and an $Al_2O_3$ content of more than 95 weight percent with $SiO_2$ in an electric arc furnace at a temperature sufficient to form a melt thereof, cooling said melt whereby to form a composition comprising an $\alpha$-corundum phase in a siliceous matrix and thereafter separating said siliceous matrix from said $\alpha$-corundum phase.

2. A method according to claim 1 wherein at least a stoichiometric amount of $SiO_2$ relevant to the alkali content is employed such that the alkali is bound by the $SiO_2$ as alkali metal silicate.

3. A method according to claim 1 wherein the $SiO_2$ is present in an amount greater than the stoichiometric amount relative to the alkali content up to 10 times the stoichiometric amount whereby to bind alkali metal present as alkali metal silicate.

4. A method according to claim 3 wherein the $SiO_2$ content of the mixture subjected to temperature in the electric arc furnace is up to 5 times the stoichiometric amount relative to the amount of alkali metal present.

5. A method according to claim 1 wherein the $SiO_2$ is supplied as quartz sand and the alumina is supplied as an alkali containing Bayer alumina having an alkali content of 0.2 to 0.6 weight percent.

6. A method according to claim 5 wherein a mixture of alumina and quartz sand are employed which supply silica in an amount of between 0.25 and 3.30 weight percent.

7. A method according to claim 1 wherein the mixture which is heated in the electric arc furnace has a total alkali oxide content of greater than 0.6 and up to 5% by weight.

8. A method according to claim 7 wherein the mixture which is heated in the electric arc furnace has a total alkali oxide of up to 3 weight percent.

9. A method according to claim 7 wherein the mixture contains more than 3.3 and up to 15 weight percent $SiO_2$.

10. A method according to claim 1 wherein the melt is cooled in a controlled manner to provide $\alpha$-corundum crystals of desired size.

11. A method according to claim 1 wherein the siliceous phase is separated from the $\alpha$-corundum phase by subjecting the resultant composition to comminuting followed by sieving.

12. A method according to claim 1 wherein the siliceous phase is separated from the $\alpha$-corundum by subjecting the resultant composition to washing with aqueous hydrochloric acid or aqueous hydrofluoric acid.

13. A method according to claim 12 wherein the comminuted material is washed with aqueous hydrochloric acid, thereafter washed with aqueous hydrofluoric acid and thereafter washed with water.

* * * * *